(12) United States Patent
Minami

(10) Patent No.: US 7,819,431 B2
(45) Date of Patent: Oct. 26, 2010

(54) FUEL TANK SUPPORTING STRUCTURE

(75) Inventor: Teruyuki Minami, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 966 days.

(21) Appl. No.: 10/575,077

(22) PCT Filed: Oct. 6, 2004

(86) PCT No.: PCT/JP2004/015105

§ 371 (c)(1),
(2), (4) Date: Apr. 7, 2006

(87) PCT Pub. No.: WO2005/035291

PCT Pub. Date: Apr. 21, 2005

(65) Prior Publication Data

US 2007/0119646 A1    May 31, 2007

(30) Foreign Application Priority Data

Oct. 7, 2003   (JP)   ............................ 2003-348059

(51) Int. Cl.
*B60P 3/00* (2006.01)
(52) U.S. Cl. .................. 280/834; 280/781; 280/784
(58) Field of Classification Search ................ 280/834, 280/781, 784; 180/303, 310
See application file for complete search history.

(56) References Cited

U.S. PATENT DOCUMENTS

| | | | | |
|---|---|---|---|---|
| 690,161 | A * | 12/1901 | Lane ........................... | 180/303 |
| 1,196,643 | A * | 8/1916 | Bedford ...................... | 180/69.5 |
| 1,523,370 | A * | 1/1925 | Skaggs ........................ | 137/205 |
| 3,559,708 | A * | 2/1971 | Cook .......................... | 206/521 |
| 4,371,181 | A | 2/1983 | Monigold | |
| 5,518,272 | A * | 5/1996 | Fukagawa et al. ............ | 280/834 |
| 5,673,939 | A * | 10/1997 | Bees et al. ................... | 280/831 |
| 5,794,979 | A * | 8/1998 | Kasuga et al. ............... | 280/834 |
| 6,042,071 | A * | 3/2000 | Watanabe et al. ............ | 248/313 |
| 6,502,660 | B1 * | 1/2003 | Scott et al. ................... | 180/314 |
| 6,676,163 | B2 * | 1/2004 | Joitescu et al. .............. | 280/834 |

(Continued)

FOREIGN PATENT DOCUMENTS

DE          43 02 546          4/1994

(Continued)

OTHER PUBLICATIONS

Japanese Office Action dated Apr. 15, 2008.

(Continued)

*Primary Examiner*—Lesley D. Morris
*Assistant Examiner*—Maurice Williams
(74) *Attorney, Agent, or Firm*—Finnegan, Henderson, Farabow, Garrett & Dunner, LLP

(57) ABSTRACT

Fuel tanks (52, 54, 56) are disposed in parallel along a vehicle transverse direction on a rear sub frame (40). The fuel tank (54) is placed on fuel tank supporting brackets (62) which span between a cross rail (46) and a cross rail (48) of the rear sub frame (40). In a case in which an impact load F1 is applied to the fuel tank (56), the fuel tank (56) abuts a rear cross member (20), and upward movement is impeded. Therefore, weak portions (70) of the fuel tank supporting brackets (62) break, and the fuel tank (54) limitedly moves toward a bottom of a vehicle body.

10 Claims, 9 Drawing Sheets

U.S. PATENT DOCUMENTS

| | | | |
|---|---|---|---|
| 6,755,460 B1 * | 6/2004 | Marrs et al. | 296/187.12 |
| 6,953,099 B2 * | 10/2005 | Kawasaki et al. | 180/65.1 |
| 6,986,494 B2 * | 1/2006 | Strasser | 248/500 |
| 7,137,474 B2 * | 11/2006 | Yokote | 180/314 |

FOREIGN PATENT DOCUMENTS

| | | |
|---|---|---|
| EP | 1 225 076 | 7/2002 |
| JP | 7-186741 | 7/1995 |
| JP | 2000-219049 | 8/2000 |
| JP | 2002-248949 | 9/2002 |
| JP | 2002-370550 | 12/2002 |
| JP | 2003-054272 | 2/2003 |
| JP | 2003-63457 | 3/2003 |
| JP | 2003-72398 | 3/2003 |
| JP | 2003-182378 | 7/2003 |

OTHER PUBLICATIONS

International Search Report.

* cited by examiner

FUEL TANK SUPPORTING STRUCTURE

TECHNICAL FIELD

The present invention relates to a fuel tank supporting structure, and in particular, to a fuel tank supporting structure which supports a plurality of fuel tanks at a vehicle body of an automobile or the like.

BACKGROUND ART

Conventionally, in a fuel tank supporting structure which supports a plurality of fuel tanks at a vehicle body of an automobile or the like, a structure is known in which the plurality of fuel tanks, which extend along the vehicle widthwise direction, are disposed in parallel with respect to the vehicle body longitudinal direction (for example, Japanese Patent Application Laid-Open (JP-A) No. 2003-63457, JP-A No. 2003-182378, JP-A No. 2003-72398, JP-A No. 2002-370550). Further, a structure is known in which a plurality of fuel tanks, which extend along the vehicle widthwise direction, are disposed in parallel with respect to the vehicle body longitudinal direction, and the fuel tanks are offset in the vertical direction (for example, JP-A No. 7-186741, JP-A No. 2000-219049).

However, in each of the structures of the aforementioned publications, when adjacent fuel tanks abut at the time of a vehicle body collision, the direction of movement of the fuel tanks is not decided. Therefore, there is the concern that a large impact load may be applied to the fuel tanks.

SUMMARY OF THE INVENTION

In view of the above-described circumstances, an object of the present invention is to provide a fuel tank supporting structure which can reduce the load which is applied to fuel tanks at the time of a collision.

In order to achieve the above-described object, in accordance with one aspect of the present invention, there is provided a fuel tank supporting structure in which a plurality of fuel tanks are disposed in parallel, comprising fuel tank guiding means for, in a case in which a load of a predetermined value or more is applied to the fuel tanks, guiding movement of at least one fuel tank downward in a vertical direction of a vehicle body.

Preferably, the fuel tank guiding means includes movement preventing means for preventing upward movement of the fuel tank, and a weak portion formed at a fuel tank supporting bracket which is disposed beneath the fuel tank, and the weak portion breaks in a case in which a load of a predetermined value or more is applied. Preferably, the weak portion is cutout formed portions of the fuel tank supporting bracket. Preferably, the fuel tank supporting bracket includes a first bracket, a second bracket, and a connecting portion connecting the both brackets, and the weak portion is the connecting portion. Preferably, the weak portion is a thin-walled portion of the fuel tank supporting bracket. Preferably, the fuel tank guiding means includes movement preventing means for preventing upward movement of the fuel tank, and inclined portions formed at opposing surfaces of adjacent fuel tanks. Preferably, the fuel tank supporting structure is set such that fuel can be successively used from a vehicle body outer side fuel tank. Preferably, the fuel tank supporting structure comprises vehicle body left and right rockers, wherein, between the rockers, the fuel tanks are disposed so as to respectively extend in a vehicle transverse direction. Preferably, the fuel tank supporting structure comprises falling-out preventing means for preventing the fuel tank from completely falling-out toward a bottom of the vehicle body. Preferably, the falling-out preventing means includes a sub frame disposed so as to be separated from the fuel tank toward a lower side of the fuel tank, and when the fuel tank moves downward, the sub frame catches on the fuel tank and can prevent the fuel tank from falling-out. Preferably, the sub frame includes at least two cross rails which are disposed at the lower side of the fuel tank so as to respectively extend in a vehicle transverse direction, and a vehicle longitudinal direction dimension between the cross rails is smaller than a diameter of the fuel tank.

Other objects, features and advantages of the present invention win become clear to those skilled in the art from the appended claims and from the description of the preferred embodiments of the present invention which are shown in the appended drawings.

BEST MODE FOR CARRYING OUT THE INVENTION

Figure 1:
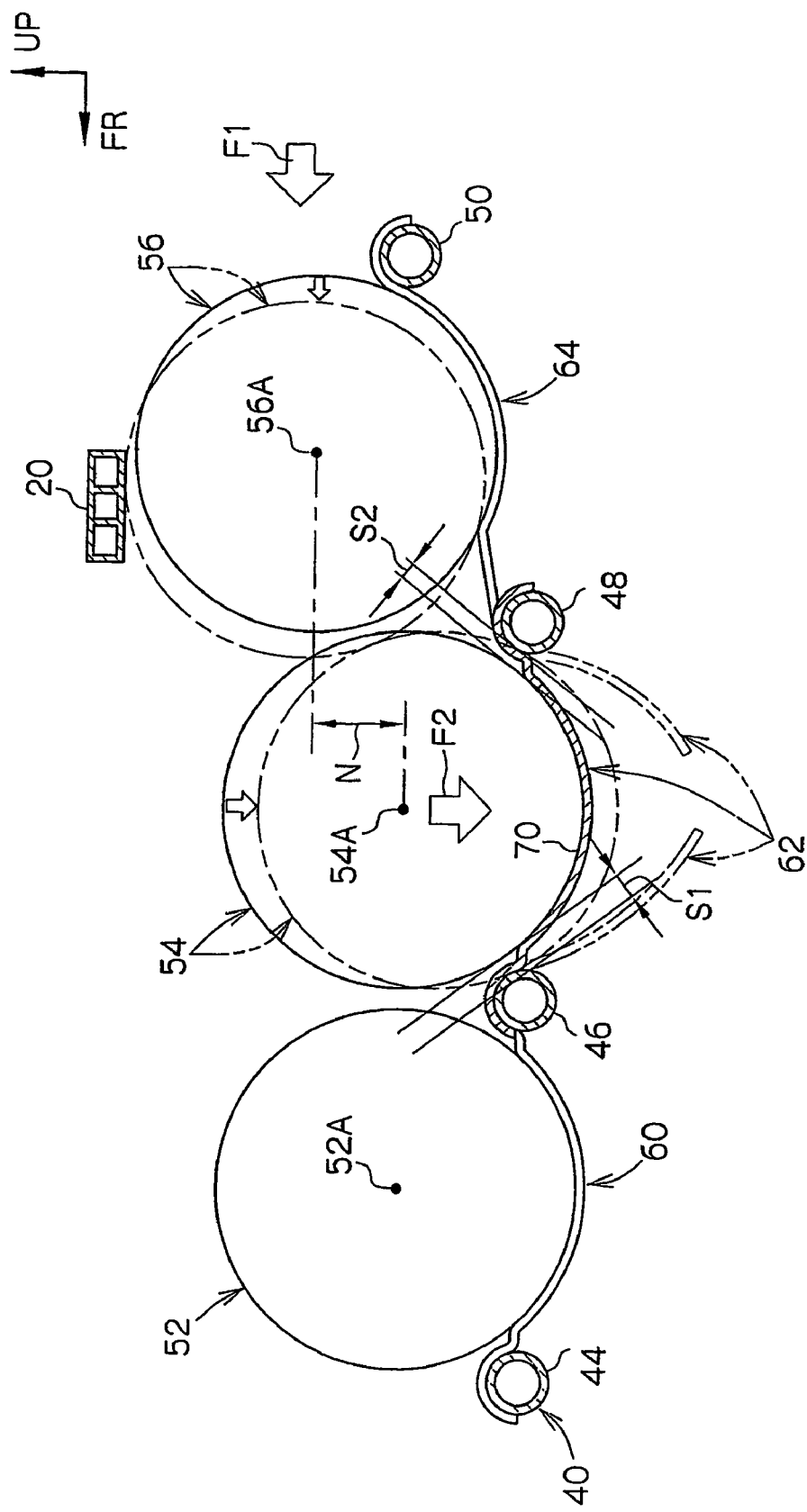
FIG. 1 is a side sectional view showing a fuel tank supporting structure relating to one embodiment of the present invention.

One embodiment of a fuel tank supporting structure of the present invention will be described with reference to FIGS. 1 through 5.

Note that arrow UP in the drawings indicates the vehicle body upward direction, arrow FR in the drawings indicates the vehicle body frontward direction, and arrow IN in the directions indicates the vehicle widthwise inner side direction.

Figure 5:
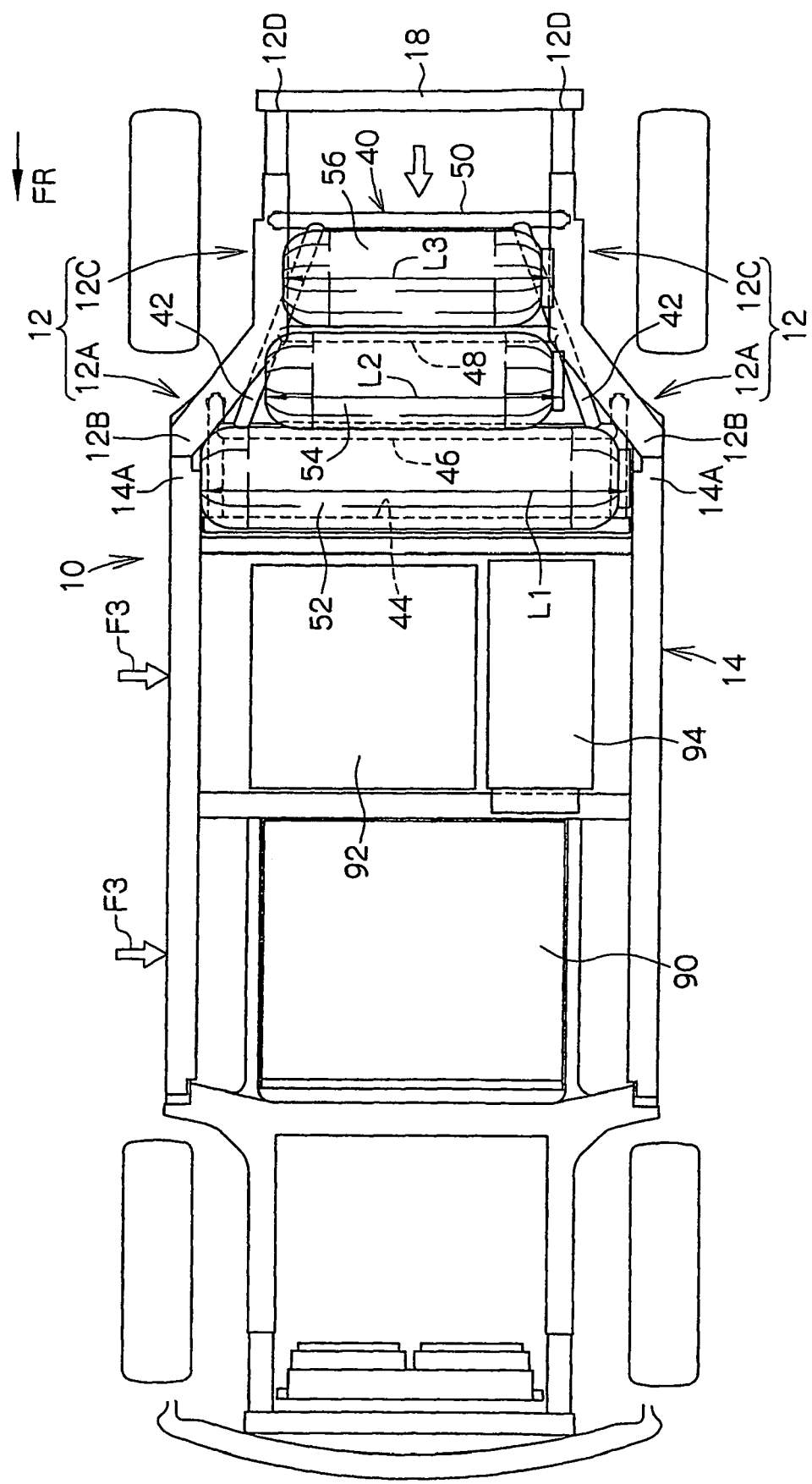
FIG. 5 is a plan view showing a vehicle body to which is applied the fuel tank supporting structure relating to the one embodiment of the present invention.

As shown in FIG. 5, rear side members 12 are disposed along the vehicle body longitudinal direction at both vehicle transverse direction end portions of the rear portion of an automobile vehicle body 10 of the present embodiment. Further, front portions 12A of the rear side members 12 are inclined from the vehicle body rear vehicle transverse direction inner side toward the vehicle body front vehicle transverse direction outer side. Front end portions 12B of the rear side members 12 are connected to rear end portions 14A of rockers 14 which are disposed along the vehicle body longitudinal direction at vehicle transverse direction both end portions of the vehicle body 10.

Rear portions 12C of the rear side members 12 extend rectilinearly along the vehicle body longitudinal direction in plan view, and a rear bumper reinforcement 18 spans between rear end portions 12D.

Figure 4:
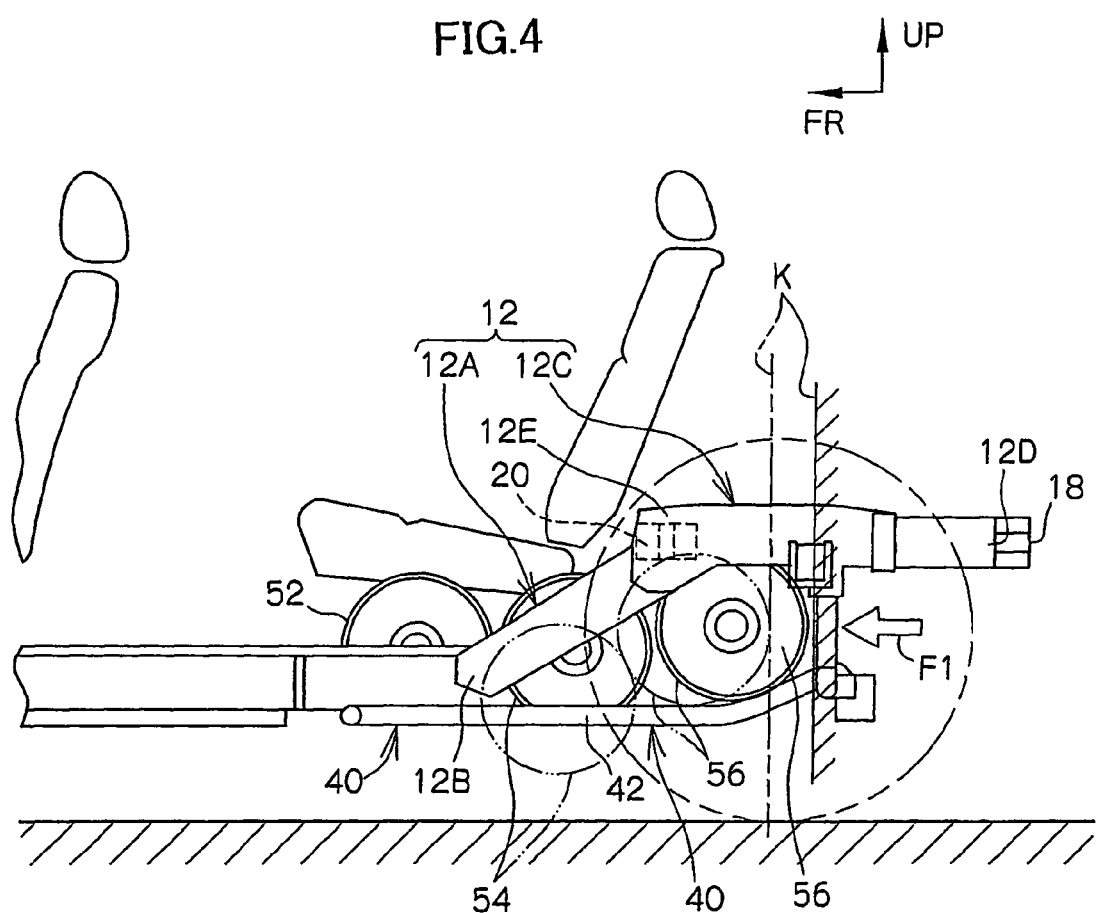
FIG. 4 is a side view showing a vehicle body rear portion to which is applied the fuel tank supporting structure relating to the one embodiment of the present invention.

As shown in FIG. 4, a rear cross member 20 spans between front end portions 12E at the rear portions 12C of the rear side members 12. The front portions 12A of the rear side members 12 are inclined from the vehicle body rear upper side toward the vehicle body front lower side. Further, the rear portions 12C of the rear side members 12 extend rectilinearly along the vehicle body longitudinal direction in side view as well. A rear sub frame 40 is disposed beneath the rear side members 12.

As shown in FIG. 5, the rear sub frame 40 is a ladder-shaped structure in which a plurality of (four in the present embodiment) cross rails 44, 46, 48, 50, which run along the vehicle transverse direction, are disposed at left and right side rails 42.

A plurality of (three in the present embodiment) fuel tanks 52, 54, 56 are disposed above the rear sub frame 40. Each of the fuel tanks 52, 54, 56 is cylinder-shaped, and the respective fuel tanks 52, 54, 56 are disposed in parallel along the vehicle transverse direction. Further, lengths L1, L2, L3, along the vehicle transverse direction, of the fuel tanks 52, 54, 56 become shorter from the vehicle body inner side (the vehicle body front side in the present embodiment) fuel tank 56 in the order of the vehicle body outer side fuel tanks 54, 56 (L1>L2>L3), and the vehicle body outer side (the vehicle body rear side in the present embodiment) fuel tank 56 is the shortest.

Figure 3:
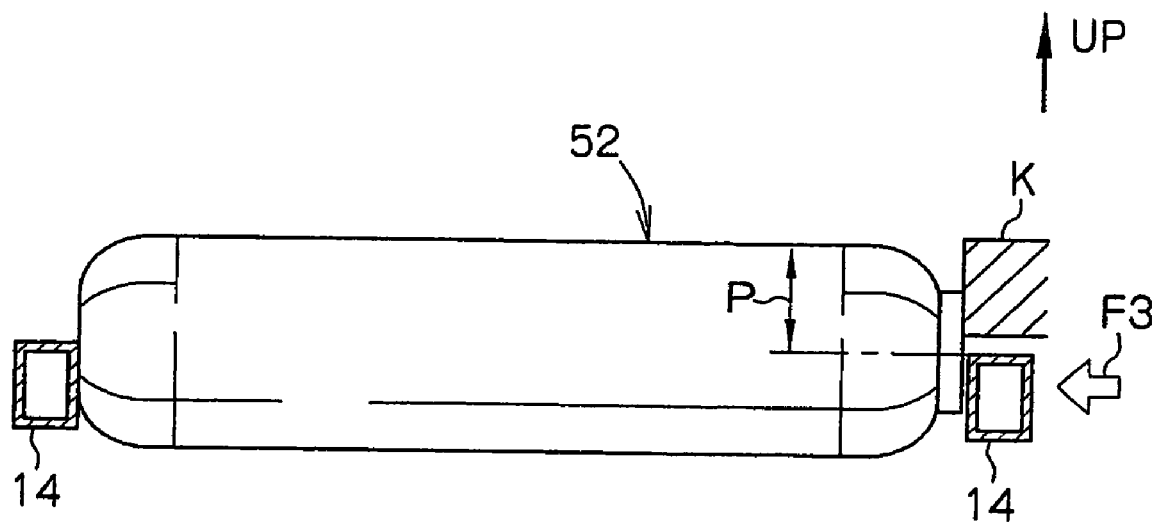
FIG. 3 is a front view showing a fuel tank of the fuel tank supporting structure relating to the one embodiment of the present invention.

As shown in FIG. 3, the fuel tank 52 extends along the vehicle transverse direction between the left and right rockers 14. Further, the fuel tank 52 projects (projection amount P) further toward the top of the vehicle body than the left and right rockers 14. When the vehicle body is collided with from the side, a bumper reinforcement K of the other vehicle, which passes above the rocker 14, abuts the fuel tank 52.

As shown in FIG. 1, the fuel tank 52 is placed on fuel tank supporting brackets 60 which span between the cross rail 44 and the cross rail 46 of the rear sub frame 40. A plurality of the fuel tank supporting brackets 60 are disposed at predetermined intervals in the vehicle transverse direction.

The fuel tank 54 is placed on fuel tank supporting brackets 62 which span between the cross rail 46 and the cross rail 48 of the rear sub frame 40. A plurality of the fuel tank supporting brackets 62 are disposed at predetermined intervals in the vehicle transverse direction.

The fuel tank 56 is placed on fuel tank supporting brackets 64 which span between the cross rail 48 and the cross rail 50 of the rear sub frame 40. A plurality of the fuel tank supporting brackets 64 are disposed at predetermined intervals in the vehicle transverse direction.

An axial center (centroid) 54A of the fuel tank 54 is set to the same height as an axial center 52A of the fuel tank 52, or a position lower than that. Further, an axial center 56A of the fuel tank 56 is set at a position which is higher (offset amount N) than the axial center 54A of the fuel tank 54. The rear cross member 20, which serves as a movement preventing means of a fuel tank guiding means, is disposed above the fuel tank 56.

Accordingly, when an impact load F1 is applied to the fuel tank 56 from the vehicle body rear side toward the vehicle body front side, the fuel tank 56 abuts the fuel tank 54. At this time, the fuel tank 56 abuts the rear cross member 20 such that upward movement is prevented. Then, a load F2 arises at the fuel tank 54 toward the bottom of the vehicle body.

Figure 2:
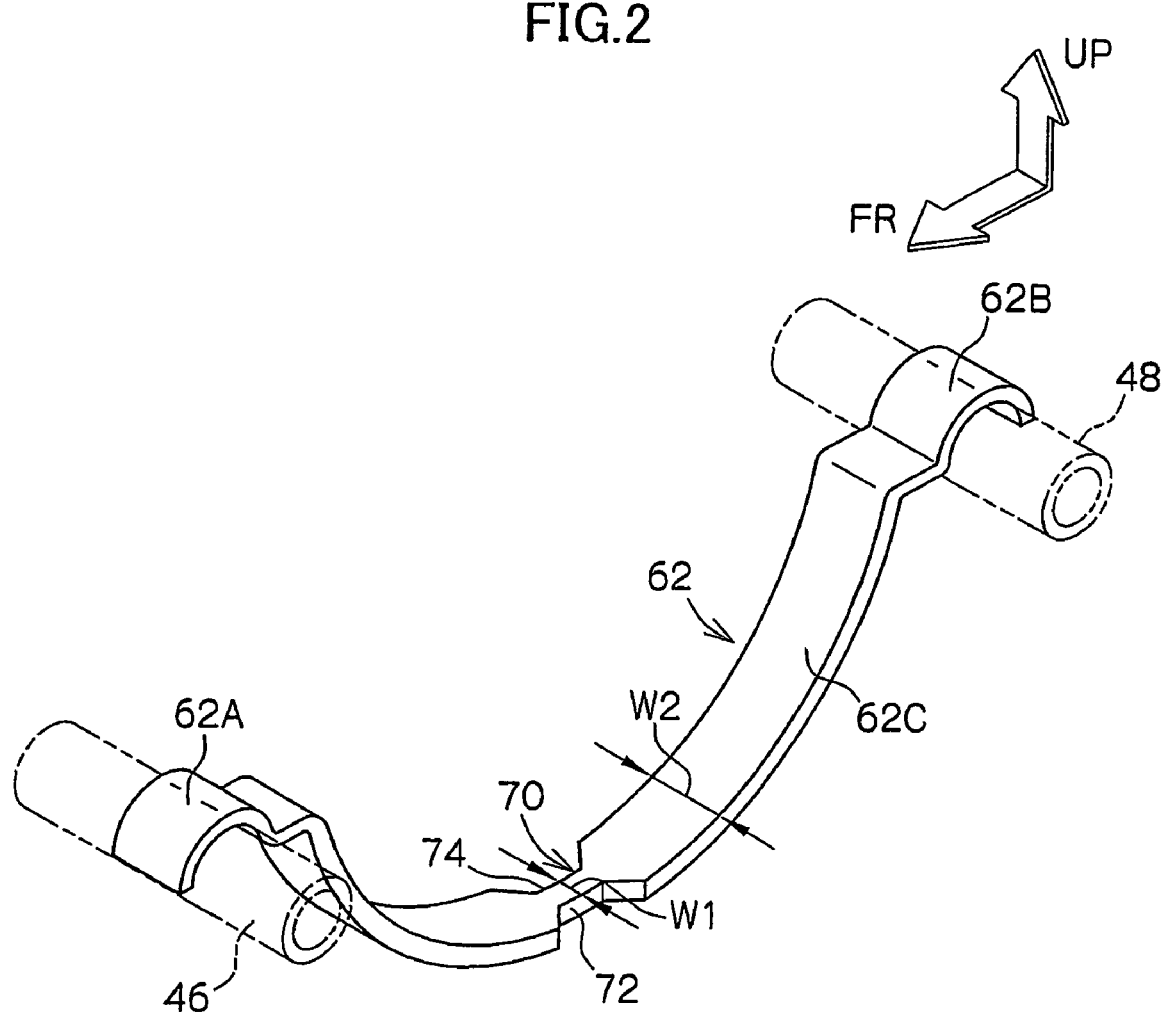
FIG. 2 is a perspective view, as seen from a front of a vehicle body and at an angle, showing a fuel tank supporting bracket of the fuel tank supporting structure relating to the one embodiment of the present invention.

As shown in FIG. 2, at the fuel tank supporting bracket 62 which supports the fuel tank 54, a front end portion 62A is a hook portion which is anchored on the cross rail 46 from above, and a rear end portion 62B is a hook portion which is anchored on the cross rail 48 from above.

A longitudinal direction intermediate portion 62C of the fuel tank supporting bracket 62 is formed in a circular-arc shape which swells toward the bottom of the vehicle body. A weak portion 70 serving as the fuel tank guiding means is formed at the lowermost portion (the longitudinal direction central portion) of the circular-arc shape.

The weak portion 70 of the fuel tank supporting bracket 62 is a cut-out formed portion in which cut-outs 72, 74, which are trapezoidal in plan view, are formed from the transverse direction both sides. A width W1 of the weak portion 70 is narrow as compared with a width W2 of the other regions (W1<W2).

As shown in FIG. 1, a gap S1 is formed between the fuel tank 56 and the cross rail 48 of the rear sub frame 40. A gap S2 is formed between the fuel tank 56 and the cross rail 46 of the rear sub frame 40.

Accordingly, when the load F2 is generated at the fuel tank 54 toward the bottom of the vehicle body and a load of a predetermined value or more is applied to the weak portion 70 of the fuel tank supporting bracket 62, as shown by the two-dot chain line in FIG. 1, the weak portion 70 of the fuel tank supporting bracket 62 breaks, and the fuel tank 54 moves toward the bottom of the vehicle body by the gaps S1, S2.

When the fuel tank 54 has moved a predetermined amount toward the bottom of the vehicle body, the fuel tank 54 abuts the cross rail 46 and the cross rail 48, which serve as falling-out preventing means, and the fuel tank 54 can be prevented from falling-out completely toward the bottom of the vehicle body.

Note that the present embodiment is set such that fuel is used successively from the vehicle body outer side fuel tank 56 in order of the vehicle body inner side fuel tanks 54, 52.

Reference numerals 90, 92, 94 in FIG. 5 respectively denote an FC stack, a PCU, and a battery which are disposed on the floor at the front of the vehicle body.

Operation of the present embodiment will be described hereinafter.

As shown in FIG. 4, when the other vehicle K or the like collides from the rear and the impact load F1 is applied to the fuel tank 56 from the vehicle body rear side toward the vehicle body front side, as shown by the two-dot chain line in FIG. 1, the fuel tank 56 moves toward the front of the vehicle body and abuts the fuel tank 54. At this time, the axial center 54A of the fuel tank 54 is set at the same height as the axial center 52A of the fuel tank 52, or at a lower position, and the axial center 56A of the fuel tank 56 is set to be at a higher position than the axial center 54A of the fuel tank 54, and the rear cross member 20 is disposed above the fuel tank 56. Therefore, the fuel tank 56 abuts the rear cross member 20 and upward movement is impeded, and the load F2 is generated at the fuel tank 54 toward the bottom of the vehicle body.

When the load F2 is generated at the fuel tank 54 toward the bottom of the vehicle body and a load of a predetermined value or more is applied to the weak portions 70 of the fuel tank supporting brackets 62, the weak portions 70 break, and the fuel tank 54 moves toward the bottom of the vehicle body by the gaps S1, S2.

As a result, it is possible to prevent a large load from being applied to the fuel tanks 56, 54, 52 at the time of a collision.

Further, because the fuel tank 52 extends along the vehicle transverse direction between the left and right rockers 14, as shown in FIG. 5, in a case in which an impact load F3 is applied to the rocker 14 at the time of a side collision, the impact load F3 can be transmitted by the fuel tank 52 from the rocker 14 at the collision side to the rocker 14 at the opposite side.

As shown in FIG. 3, because the fuel tank 52 projects (projection amount P) further toward the top of the vehicle body than the left and right rockers 14, at the time of a side collision, the fuel tank 52 abuts the bumper reinforcement K or the like of the other vehicle which passes above the rocker 14. As a result, the amount of entry of the bumper reinforcement K of the other vehicle into the vehicle body can be reduced.

Further, in the present embodiment, when the fuel tank 54 moves a predetermined amount toward the bottom of the vehicle body, the fuel tank 54 abuts the cross rail 46 and the cross rail 48. Therefore, the fuel tank 54 can be prevented from falling-out completely toward the bottom of the vehicle body, by the cross rail 46 and the cross rail 48.

Further, in the present embodiment, the fuel tanks 52, 54, 56, together with the FC stack 90, the PCU 92, and the battery 94 which are disposed on the floor of the front of the vehicle body, can be utilized as structural members of the vehicle body.

Further, in the present embodiment, the lengths L1, L2, L3, along the vehicle transverse direction, of the vehicle body front side fuel tank 52, the intermediate fuel tank 54, and the vehicle rear side fuel tank 56, have the relationship L1>L2>L3. As a result, the weight of the fuel tank at the time of loading at the vehicle body can be made to be lighter the further toward the outer side (the rear) of the vehicle body, and therefore, the weight distribution of the vehicle body can be improved.

Further, in the present embodiment, fuel is used successively from the vehicle body outer side (rear side) fuel tank 56 to the fuel tank 54 further toward the vehicle body inner side (front side) than that, and then the front side fuel tank 52. As a result, as the fuel is used up, it becomes successively lighter from the vehicle body outer side fuel tank 56 in the order of the vehicle body inner side fuel tanks 54, 52, and therefore, the weight distribution of the vehicle body improves as fuel is used by traveling.

Moreover, in the present embodiment, the axial center 56A of the outermost (rearward) fuel tank 56 is set to be at a higher position than the axial centers 52A, 54A of the other fuel tanks 52, 54. Therefore, by using fuel successively from the vehicle body outer side (rear side) fuel tank 56 to the vehicle body inner side (front side) fuel tanks 54, 52, the center of gravity of the vehicle body also can be lowered as fuel is used by traveling.

Figure 6:
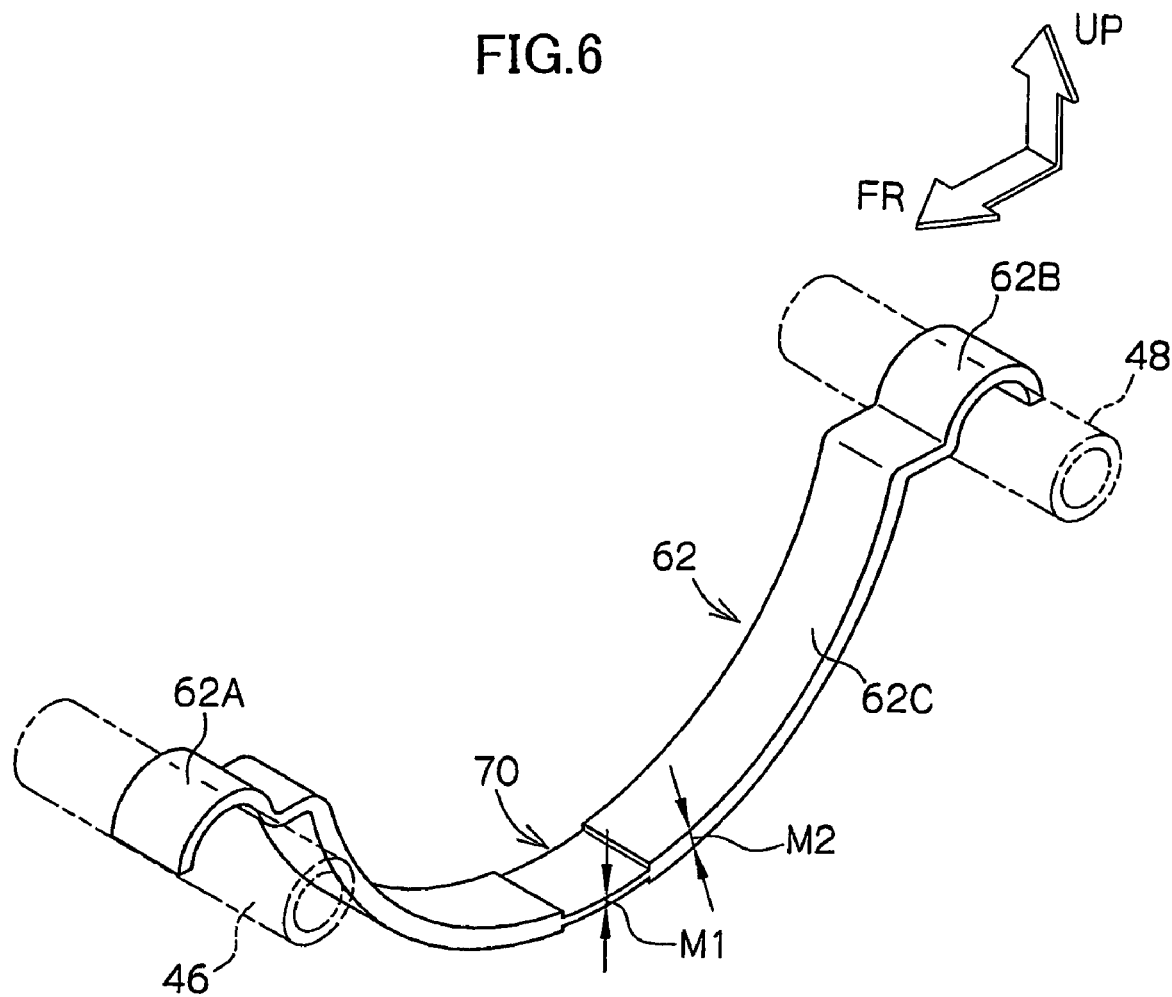
FIG. 6 is a perspective view, as seen from a front of a vehicle body and at an angle, showing a fuel tank supporting bracket of a fuel tank supporting structure relating to another embodiment of the present invention.

By the way, the present invention is not limited to the above-described embodiment, and it is clear to persons skilled in the art that various other embodiments are possible within the scope of the present invention. For example, in the above-described embodiment, the weak portion 70 of the fuel tank supporting bracket 62 is made to be the cut-out formed portion in which the cut-outs 72, 74 are formed from the transverse direction both sides. However, instead, as shown in FIG. 6, the weak portion 70 of the fuel tank supporting bracket 62 may be made to be a thin-walled portion, and a plate thickness M1 of the weak portion 70 may be structured so as to be thin as compared with a plate thickness M2 of the other regions (M1<M2).

Figure 7:
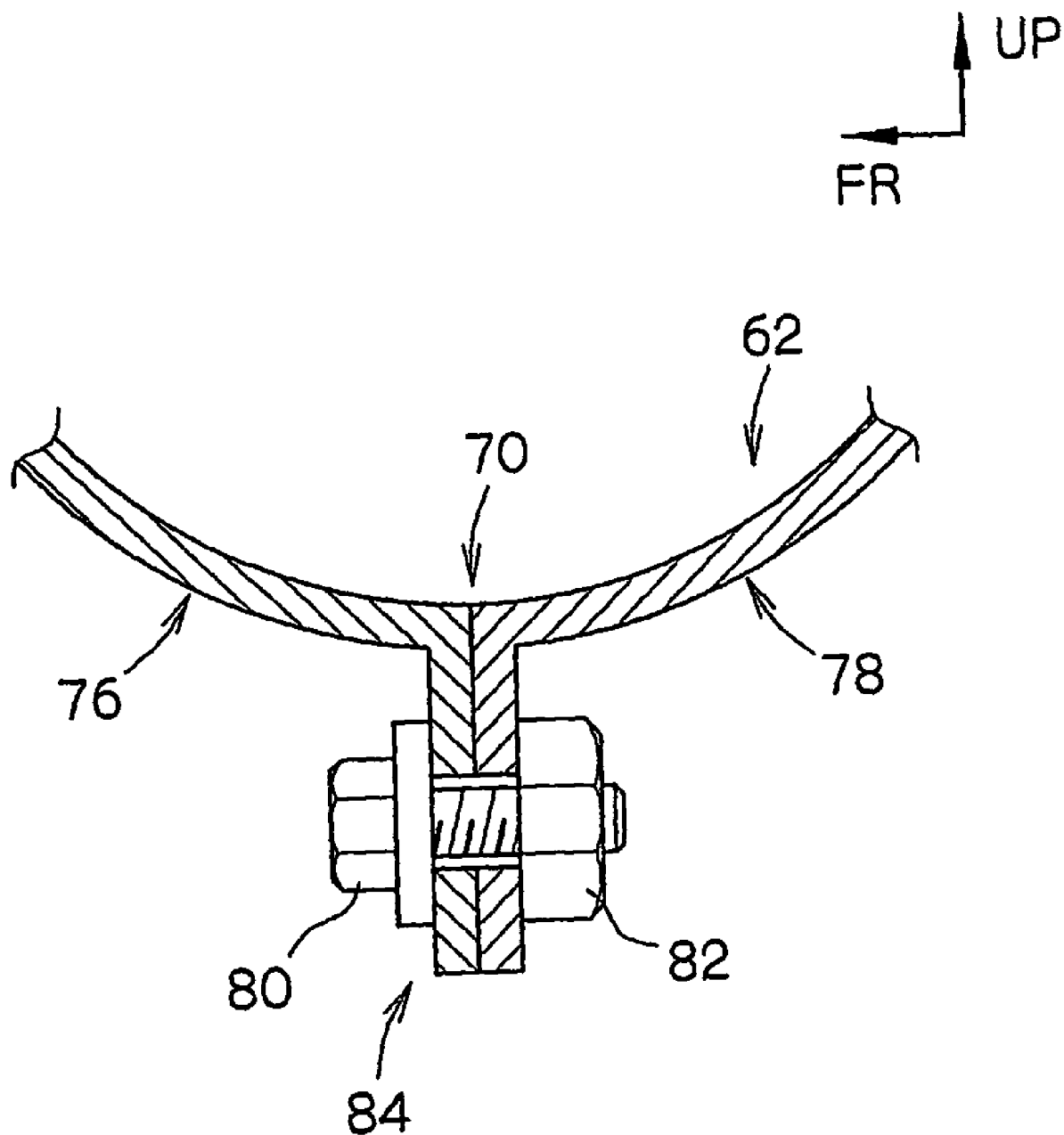
FIG. 7 is a side sectional view showing a portion of a fuel tank supporting bracket of a fuel tank supporting structure relating to another embodiment of the present invention.
Figure 8:
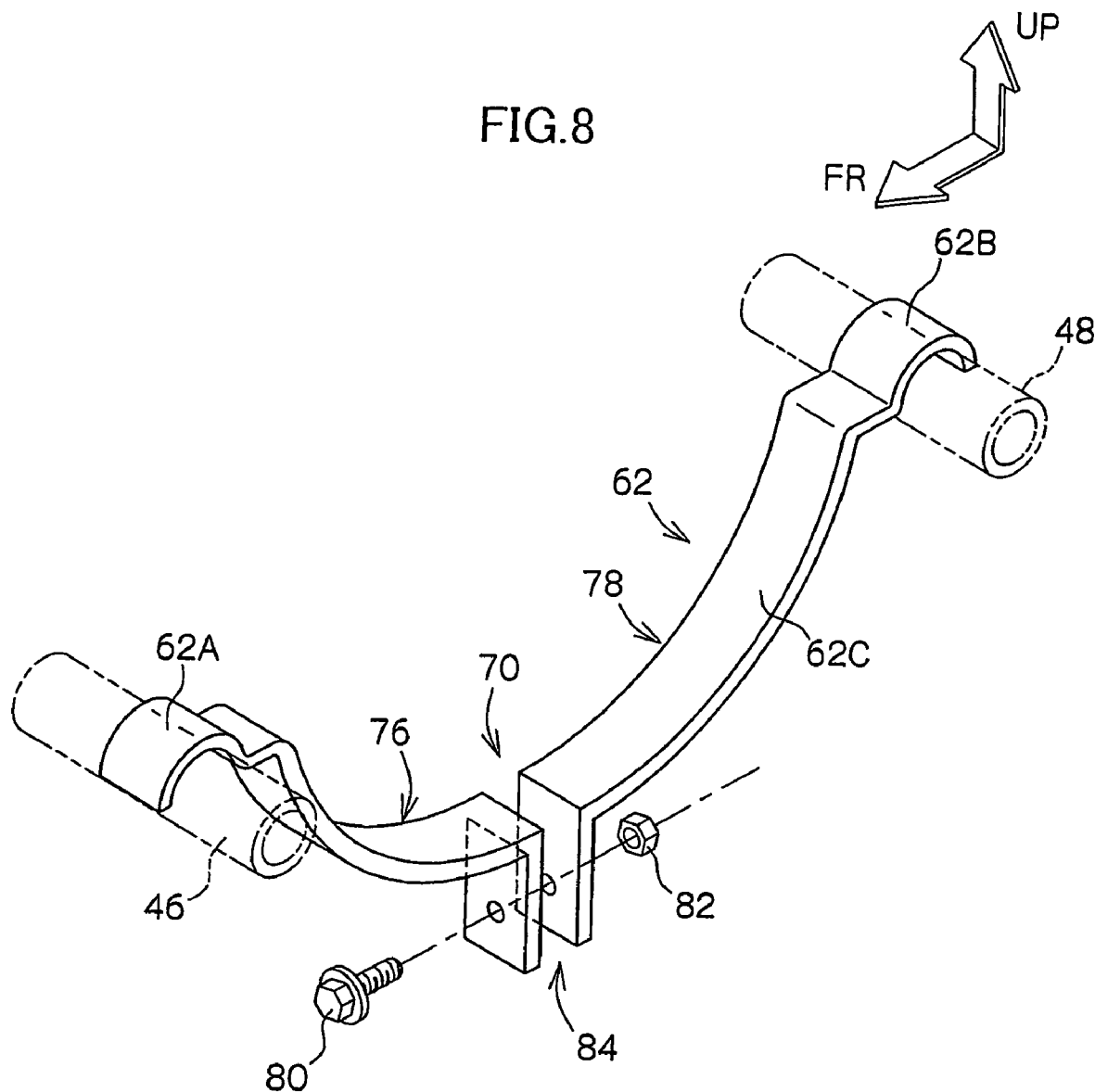
FIG. 8 is an exploded perspective view, as seen from the front of the vehicle body and at an angle, showing the fuel tank supporting bracket of the fuel tank supporting structure relating to the other embodiment of the present invention.

Further, as shown in FIGS. 7 and 8, a structure may be used in which the fuel tank supporting bracket 62 is divided into a first bracket 76, which structures the front half of the fuel tank supporting bracket 62, and a second bracket 78, which structures the rear half of the fuel tank supporting bracket 62, and a connecting portion 84 by a bolt 80 and nut 82 or pin (not illustrated) or the like, which connect the first bracket 76 and the second bracket 78, is made to be the weak portion 70.

Figure 9:
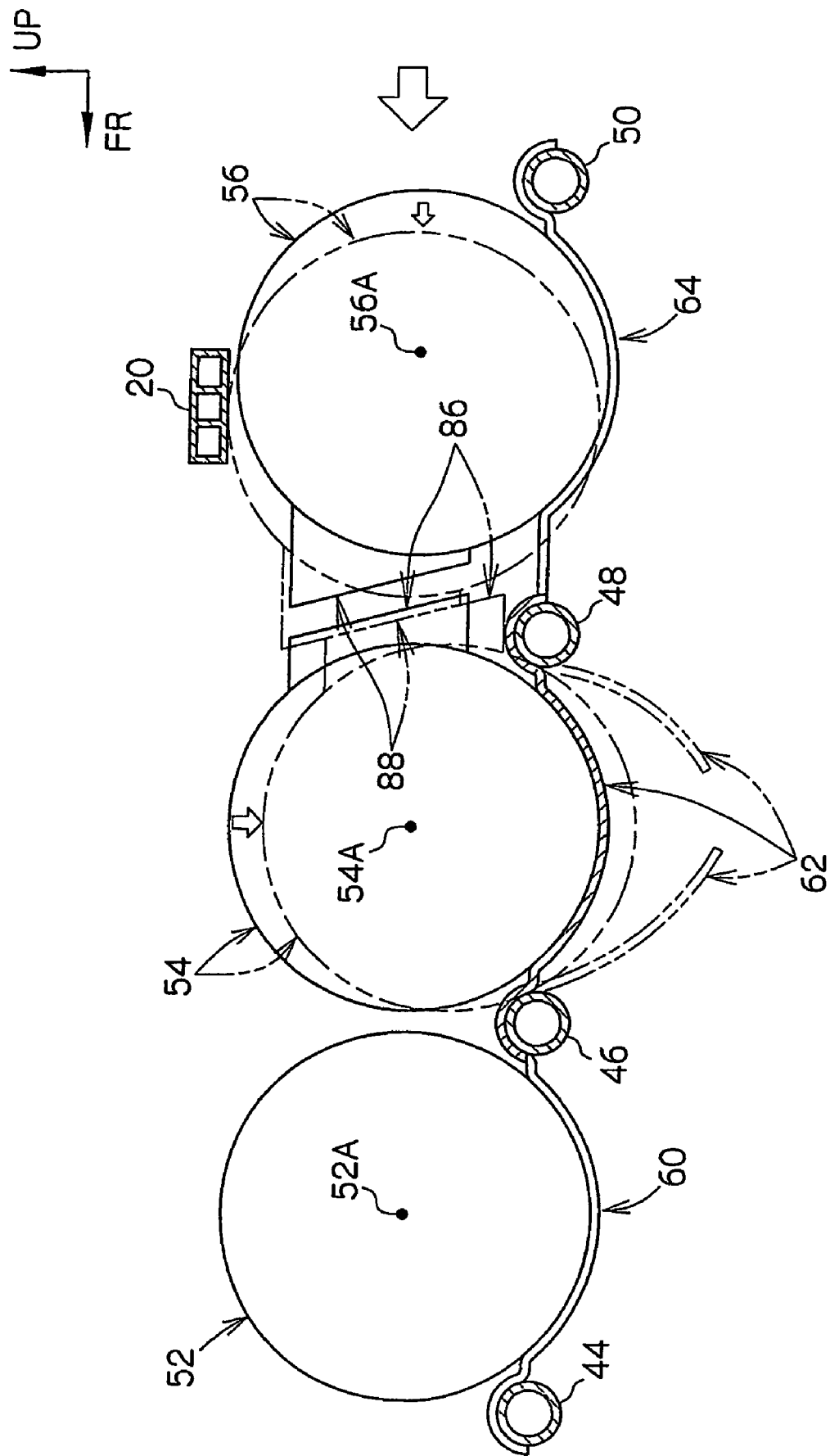
FIG. 9 is a side sectional view showing a fuel tank supporting structure relating to another embodiment of the present invention.

Further, in the above-described embodiment, as shown in FIG. 1, in order to move the fuel tank 54 downward at the time of a collision, the axial center 56A of the fuel tank 56 is set at a position which is slightly higher than the axial center 54A of the fuel tank 54. However, instead, as shown in FIG. 9, a structure may be used in which the axial center 56A of the fuel tank 56 and the axial center 54A of the fuel tank 54 are the same height, and inclined portions 86, 88 are formed at the respective opposing surfaces the adjacent fuel tank 56 and fuel tank 54, and when the fuel tank 56 abuts the fuel tank 54, due to the inclined portion 88 and the including portion 86 sliding, the fuel tank 54 is moved downward. Note that, in this case, because there is no need to offset the fuel tank 56 and the fuel tank 54 in the vertical direction, the height of the fuel tank assembly formed from the fuel tanks 52, 54, 56 can be made smaller.

Further, in the above-described embodiment, the fuel tank supporting structure of the present invention is applied to the vehicle body rear portion, but the fuel tank supporting structure of the present invention can also be applied to the vehicle body front portion.

By the way, including the sub frame 40 as the falling-out preventing means which prevents the fuel tank 54 from completely falling-out toward the bottom of the vehicle body was described above. Namely, at the time of a collision or the like, in a case in which the fuel tank 54 moves downward, the sub frame 40 catches on the fuel tank 54, and the fuel tank 54 can be impeded from falling-out completely from the vehicle body. As one measure for easily realizing this, the sub frame 40 includes at least the two cross rails 46, 48 which are disposed so as to respectively extend in the vehicle transverse direction at the lower side of the fuel tank 54, and the vehicle longitudinal direction dimension between the cross rails 46, 48 is smaller than the diameter (or the front-back width) of the fuel tank 54. By structuring in this way, in a case in which the fuel tank 54 moves downward, the fuel tank 54 is caught between the cross rails 46, 48, and the fuel tank 54 can reliably be impeded from completely falling-out from the vehicle body.

The invention claimed is:

1. A vehicle fuel tank supporting structure supporting a plurality of parallel adjacent fuel tanks, the supporting structure comprising:

a first fuel tank support supporting a first fuel tank of the plurality of parallel fuel tanks, the first fuel tank having a first axial center a first height above a floor of the vehicle;

a second fuel tank support supporting a second fuel tank of the plurality of parallel fuel tanks, the second fuel tank having a second axial center a second height above the floor of the vehicle, the second height being lower than the first height, the second fuel tank support having a length and a first transverse width, with one portion along the length defining a weakened portion having a second transverse width shorter than the first transverse width; and a longitudinal movement stopping device, stopping a longitudinal movement by the first fuel tank, and redirecting the longitudinal movement of the first fuel tank to apply a downward biasing force to the second fuel tank, thereby moving the second fuel tank in a downward direction toward the vehicle floor;

wherein the weakened portion is configured to break when the downward biasing force applied to the second fuel tank is equal to or greater than a predetermined value and wherein the longitudinal movement stopping device is positioned at a third height above the floor of the vehicle, the third height being higher than the first height.

2. The fuel tank supporting structure of claim 1, wherein the first and second fuel tank supports are positioned such that fuel can be successively used initially from the first fuel tank and subsequently from the second fuel tank.

3. The fuel tank supporting structure of claim 1, further comprising vehicle body left and right rockers, wherein between the rockers, the fuel tanks are disposed respectively extending in a vehicle transverse direction.

4. The fuel tank supporting structure of claim 1, further comprising falling-out preventing structure preventing the fuel tank from completely falling to the floor of the vehicle body.

5. The fuel tank supporting structure of claim 4, wherein the falling-out preventing structure includes a sub frame disposed so as to be separated from the fuel tank toward a lower side of the fuel tank, and when the second fuel tank moves downward, the sub frame catches on the fuel tank, preventing the fuel tank from falling to the floor.

6. The fuel tank supporting structure of claim 5, wherein the sub frame includes at least two cross rails which are disposed at the lower side of the fuel tank so as to respectively extend in a vehicle transverse direction, and a vehicle longitudinal direction dimension between the cross rails is smaller than a diameter of the fuel tank.

7. The fuel tank supporting system of claim 1, further comprising a third fuel tank support supporting a third fuel tank having a third axial center.

8. The fuel tank supporting system of claim 1, wherein the longitudinal movement of the first fuel tank is caused by a vehicle collision.

9. The fuel tank supporting system of claim 1, wherein the first and second fuel tank supports are positioned such that fuel can be successively used initially from one of the first and second fuel tanks, and subsequently from the other of the first and second fuel tanks.

10. The fuel tank supporting system of claim 4, wherein the falling-out preventing structure comprises first and second cross rails supporting the second fuel tank support, the first and second cross rails positioned to abut against and support the second fuel tank upon breakage of the second fuel tank support and movement of the second fuel tank a predetermined distance toward the vehicle floor.

* * * * *